United States Patent [19]

Claessens et al.

[11] Patent Number: 5,271,909

[45] Date of Patent: Dec. 21, 1993

[54] METHOD OF TELLURIUM SEPARATION FROM COPPER ELECTROREFINING SLIME

[75] Inventors: Pierre L. Claessens, St-Eustache; Carl W. White, Montreal, both of Canada

[73] Assignee: Noranda, Inc., Toronto, Canada

[21] Appl. No.: 910,250

[22] Filed: Jul. 9, 1992

[30] Foreign Application Priority Data

Aug. 15, 1991 [CA] Canada .................................. 2049276

[51] Int. Cl.$^5$ .............................................. C01B 19/00
[52] U.S. Cl. ........................................ 423/34; 423/37; 423/41; 423/150.5; 423/508; 423/509; 423/510; 75/714
[58] Field of Search ............... 423/509, 510, 508, 418, 423/23, 24, 27, 41, 34, 37; 75/418, 714; 204/105

[56] References Cited

U.S. PATENT DOCUMENTS

| | | | |
|---|---|---|---|
| 4,002,544 | 1/1977 | Heimala et al. | 204/109 |
| 4,047,939 | 9/1977 | Morrison | 423/509 |
| 4,094,668 | 6/1978 | Yannopoulos et al. | 423/509 |
| 4,299,810 | 11/1981 | Snow | 423/510 |
| 5,160,588 | 11/1992 | Sugawara et al. | 423/508 |

FOREIGN PATENT DOCUMENTS 1091035 12/1980 Canada .
57-73139 5/1982 Japan .

OTHER PUBLICATIONS

Chemical Abstracts 114:106355g vol. (12) (1990), 114:232402h vol. (24) (1991) 108(24):208186w (1988), and 103(4):25462k (1985).

*Primary Examiner*—David Brunsman
*Attorney, Agent, or Firm*—Keck, Mahin & Cate

[57] ABSTRACT

A method of increasing the extraction of tellurium from copper electrorefining slime comprises leaching the slime with dilute sulphuric acid in a reactor under a partial oxygen pressure of up to 150 psi and at an elevated temperature between about 100° and 200° C. until copper, nickel and substantially all of the tellurium is dissolved, thereby forming a leach slurry, and contacting the slurry with an appropriate reducing agent immediately after the leaching operation has been halted and the leaching reactor brough back to atmospheric pressure to reprecipitate any excessive quantities of silver and selenium solubilized during the leaching operation.

3 Claims, No Drawings

METHOD OF TELLURIUM SEPARATION FROM COPPER ELECTROREFINING SLIME

This invention relates to a method of increasing the extraction of tellurium from copper electrorefining slime.

Slime produced during conventional copper electrorefining processes normally contain a large variety of elements, including noble metals (Ag, Au, Pt and Pd) as well as significant quantities of selenium, tellurium, copper, lead and nickel. Several methods to treat these slimes for recovery of their metal content are described in the literature and are used with various degrees of success in the industry. Whenever selenium and tellurium are present simultaneously in significant concentrations in the slime, an important criterion in selecting the slime treatment method is that it provides a clean separation between these two elements.

One method developed for this purpose is described in a patent granted to Noranda Mines Limited, Canada (Morrison B. H., Canadian Patent No. 1,091,035). The method described in this patent consists in leaching the slime with dilute sulphuric acid under a partial oxygen pressure of up to 50 psi at a temperature ranging between about 82° and 160° C. Under these conditions, it has been claimed that almost all the copper and about 75% of tellurium is leached while selenium, silver and the other noble metals remain in the residue. The above method has been used extensively at the CCR division of Noranda Minerals Inc. However experience has shown that the degree of tellurium extraction does vary over a very wide range and appears to depend on the composition of the anode slime feed to the pressure reactor. Furthermore, the selectivity of the process towards silver and selenium dissolution has also been shown to vary with the initial slime composition. Tellurium extraction varies from 27 to 87% depending on the initial slime composition. Selenium and silver are also shown to dissolve to the extent of up to 4.5 and 10% respectively.

Applicant has surprisingly discovered that whenever particular batches of slime are subjected to leaching conditions leading to partial dissolution of selenium and silver, a corrective measure can be applied to reverse the dissolution of these elements without impairing to any significant degree the extent of extraction of tellurium.

The method in accordance with the present invention comprises leaching the slime with dilute sulphuric acid in a reactor under a partial oxygen pressure of up to 150 psi and at an elevated temperature between about 100° and 200° C. until copper, nickel and substantially all of the tellurium is dissolved, and contacting the leach slurry with an appropriate reductant immediately after the leaching process has been halted and the leaching reactor brought to atmospheric pressure to reprecipitate any excessive quantities of silver and/or selenium solubilized during the leaching operation.

The reduction of any dissolved silver or selenium is normally rapid. The duration of the reduction step depends on the amount of silver and/or selenium dissolved and on the rate of addition of the reductant. Usually this step will be completed in less than 30 minutes.

A reducing agent which has been proven to be suitable for the purpose is sulphur dioxide, although other reducing agents can be used. For example, sodium sulphite or some other inorganic compounds or low molecular, weight organic acids known to provide sufficient reducing properties (e.g. hydrazine or its derivatives, etc . . . ).

The method of the invention provides for the possibility of operating the leaching reaction under more severe conditions, whenever the "standard conditions" are insufficient to allow for acceptable high tellurium extractions, as is the case with some particular slime compositions.

The invention will now be disclosed, by way of example, with reference to the following examples 1 and 2:

EXAMPLE 1

A slime leach test was carried out using a 2-L laboratory scale autoclave charged with a 25% by weight slurry of raw slime in 25% by weight sulphuric acid solution. The slime consisted in a typical composite sample from CCR's refinery and contained 20.3% Cu, 3.19% Te, 10.9% Se, 21.3% Ag, 0.52% Ni, 8.5% Pb, 1.83% As, 0.95% Sb and 0.36% Bi. The test was carried out for a period of three hours at a pressure of 100 psi oxygen partial pressure and at a temperature of 150° C. At the end of the three hours the tellurium extraction had reached a value of 81.9%. Copper and nickel extraction were almost complete. Under these relatively severe leaching conditions, small quantities of silver and selenium were found to be dissolved to reach concentrations in the solution of 0.14 and 0.13 g/L respectively. The slurry was further treated by sparging a small quantity of sulphur dioxide for up to 15 minutes. Samples of the slurry were removed every 5 minutes and subjected to chemical analysis. The results of these analyses have indicated that, after 5 minutes of sparging, the silver and selenium levels had decreased to <0.1 mg/L and 11 mg/L respectively. No tellurium was shown to have reprecipitated.

EXAMPLE 2

The same leach test as in example 1, was repeated with the exception that the partial oxygen pressure was increased to 150 psi. In this case, the final tellurium extraction after 3 hours of reaction reached 86.0%. Again in this case, small quantities of silver and selenium dissolved to reach 0.41 and 1.76 g/L respectively. A similar treatment of the leach slurry, using sulphur dioxide, as in example 1 resulted in reprecipitation of these two elements. Their final concentrations were found to be <1 mg/L Ag and 31 mg/L Se. No significant quantity of tellurium was reprecipitated.

The pressure and temperature conditions used during the tests presented in the two examples above are relatively severe when compared with conditions normally applied in the industry as disclosed in the above mentioned Canadian Patent No. 1,091,035. Milder conditions would result in a lesser degree of silver and selenium dissolution. However, this would be at the cost of a significant decrease in the extent of tellurium extraction. This is illustrated in the following example:

EXAMPLE 3

A sample of the same slime as that used in examples 1 and 2 above was subjected to pressure leaching at a temperature of 115° C. and under an oxygen overpressure of 40 psi. This test was carried out in quadruplicate. The tellurium extraction was shown to average a value of 64.1±3.4%. Although, in this case, there was no significant quantities of silver or selenium co-extracted with the tellurium, the degree of tellurium extraction was much lower than the values obtained under more severe conditions, as shown in examples 1 and 2 above. Such lowering in tellurium extraction is definitely not desired in practice as it would result in high recirculation loads of tellurium in the subsequent steps of the slime treatment for recovery of selenium and precious metals.

We claim:

1. A method of increasing the extraction of tellurium from copper electrorefining slime comprising:

a) leaching the slime with dilute sulphuric acid in a reactor under an oxygen partial pressure of up to 150 psi and at an elevated temperature between about 100° and 200° C. until copper, nickel and substantially all of the tellurium in the slime are dissolved, thereby forming a leach slurry comprising the copper, nickel, substantially all the tellurium and a small amount of silver and selenium present in the slime; and b) contacting the slurry with a reducing agent immediately after the leaching operation has been halted and the leaching reactor brought back to atmospheric pressure, said reducing agent having sufficient reducing properties to reprecipitate silver and selenium solubilized during the leaching step.

2. A method as defined in claim 1, wherein the contact period is less than 30 minutes.

3. A method as defined in claim 1, wherein the reducing agent is selected from the group consisting of sulphur dioxide, sodium sulfite, hydrazine.

* * * * *